Figures 1, 2:
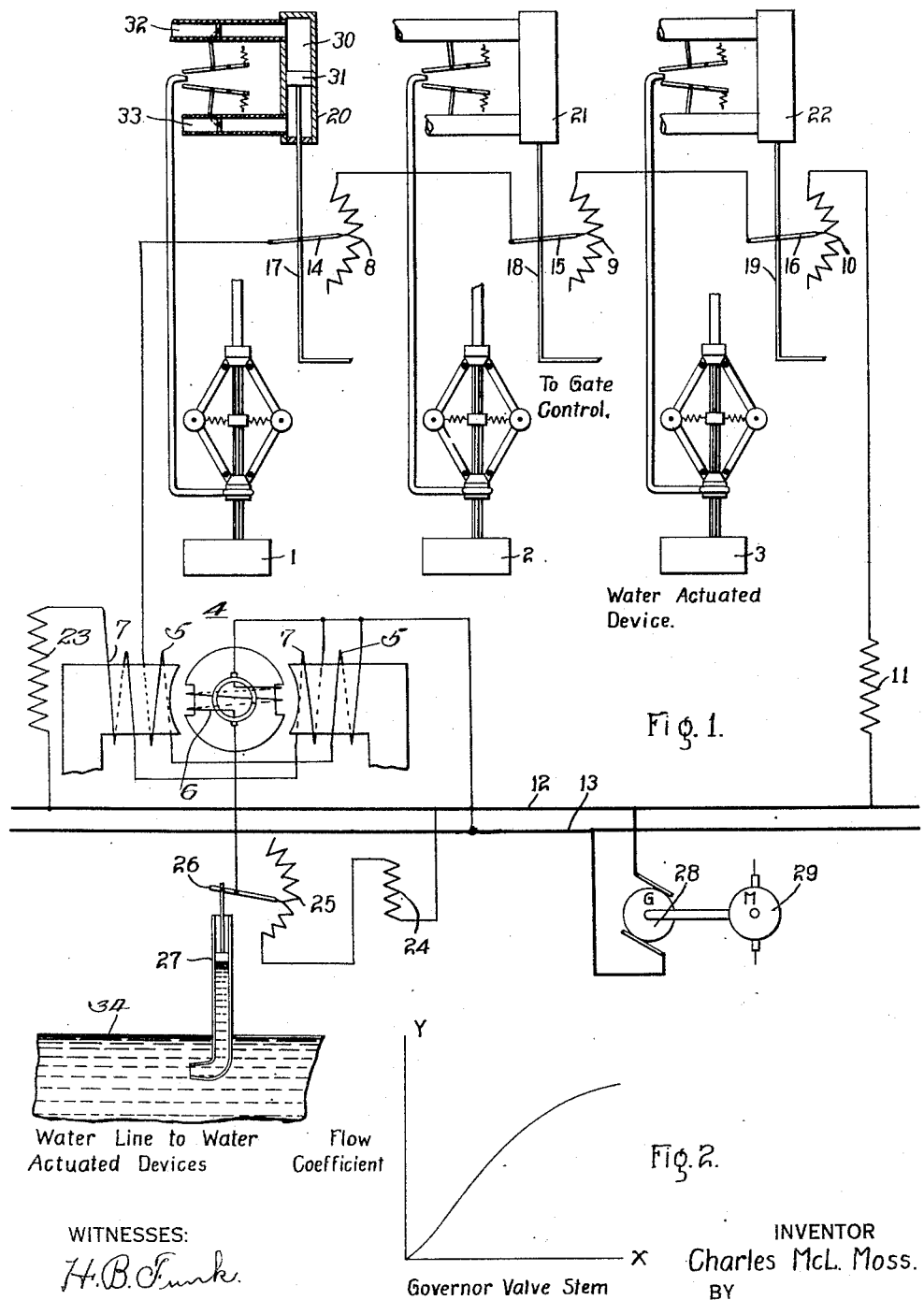

Feb. 2, 1926.

C. McL. MOSS 1,571,293

FLOW METER

Filed May 19, 1922

Water Line to Water Actuated Devices

Flow Coefficient

Governor Valve Stem

WITNESSES:
H. B. Funk
J. E. Foster

INVENTOR
Charles McL. Moss.
BY
Wesley G. Carr
ATTORNEY

Patented Feb. 2, 1926.

1,571,293

UNITED STATES PATENT OFFICE.

CHARLES McL. MOSS, OF PITTSBURGH, PENNSYLVANIA, ASSIGNOR TO WESTINGHOUSE ELECTRIC & MANUFACTURING COMPANY, A CORPORATION OF PENNSYLVANIA.

FLOW METER.

Application filed May 19, 1922. Serial No. 562,071.

*To all whom it may concern:*

Be it known that I, CHARLES McL. Moss, a citizen of the United States, and a resident of Pittsburgh, in the county of Allegheny and State of Pennsylvania, have invented a new and useful Improvement in Flow Meters, of which the following is a specification.

My invention relates to fluid-flow meters and particularly to electrically-operated types of such meters.

My invention has for its object to provide a simple and accurate means for electrically measuring the flow of fluid to one or more devices, and also to provide means for facilitating the observation of the readings.

In many hydraulic power plants, it becomes necessary to determine the total water consumption during any given period of time. The water consumption is ordinarily determined, at the present time, by providing the governor system with some form of indicating device. The flow-coefficient of a wheel having been determined for various gate openings, to determine the total amount of water flowing, the flow coefficient of the wheel at the given gate opening is multiplied by the velocity of the fluid, which is equal to 8.02 times the square root of the head of the fluid. If, however, the number of wheels is large and the load or head varies, this calculation requires a great amount of time and is continually subject to various personal errors. My invention affords a simple and accurate means for electrically measuring the flow and providing indications in a simple, positive and available form.

In carrying out my invention, I provide means for measuring the summation of the flow coefficients of a plurality of devices and means for measuring the velocity of the fluid, said means being in quadrature relations in order that their effects may multiply to measure the total fluid flow.

Figure 1 of the accompanying drawing is a diagrammatic view of a fluid-flow meter embodying my invention, and Fig. 2 is a diagram illustrating the relation between the governor valve stem position and the flow coefficient of gate opening.

It is desired to measure the total flow of water to the water-actuated devices 1, 2 and 3. A meter 4 having two co-operating quadrature windings 5 and 6, and one differential winding 7, is provided to indicate the rate or the total amount of flow. The resistors 8, 9, 10 and 11 are connected, in series relation with winding 5, across the control bus-bars 12 and 13. The amount of the resistors 8, 9 and 10 in the circuit of winding 5 may be varied by means of the sliding members 14, 15 and 16 which are attached to the valve stems 17, 18 and 19 of the governor-controlled actuating means 20, 21 and 22 the valves of the water-actuated devices 1, 2 and 3, respectively. A resistor 23 is connected in series relation with winding 7 of the meter, across the bus-bars 12 and 13. A resistor 24, a variable resistor 25 and a sliding member 26, actuated by a pressure device 27, are connected in series relation with the winding 6 of the meter and across the bus-bars 12 and 13. A generator 28, driven by a motor 29, supplies a constant potential to the bus-bars 12 and 13.

Under ordinary conditions, the position of the valve stem associated with a water wheel is not a direct proportional indication of the amount of water flowing. If the position of the valve stem were plotted on the X axis, against the flow of water, on the Y axis, the resulting curve might be somewhat as indicated in Fig. 2. This curve constitutes the characteristic flow-coefficient curve of the wheel.

When the water wheels 1, 2 and 3 are at rest, the resistors 8, 9, 10 and 11 are totally included in the circuit of the winding 5 of the meter. The resistors 8, 9 and 10 are proportioned to conform to the said characteristic flow-coefficient curve of the wheels 1, 2 and 3, respectively, and, consequently, for any given position of the governor valve stem, the amount of resistance withdrawn from the circuit of the winding 5 is in accordance with the effective area of that particular gate opening. As the gate opens to permit a greater flow of water, more resistance is withdrawn from the circuit of the winding 5 by the action of the valve stems 17, 18 and 19 and the moving members 14, 15 and 16. When a plurality of wheels is actuated, the current in winding 5 is proportional to the summation of the effective areas of the several gate openings. The resistor 11 serves to prevent excessive currents incidental to the complete withdrawal of the variable resistors 14, 15 and 16, due to maximum water flow. When the gates are completely closed, there is still a current traversing the winding 5 of the meter 4. In order to get an effect of zero current at zero gate opening, the differential winding 7 of the meter 4 is wound with the same number of turns as the winding 5, but is oppositely connected. The winding 7 is connected in series relation with a resistor 23, having a resistance equal to the sum of the resistances of the several resistors 8, 9, 10 and 11. The current traversing winding 7 thus equals the current traversing winding 5 when the variable resistors 8, 9 and 10 are totally in the circuit, the gates being closed. The two windings 5 and 7, of the meter 4, being oppositely connected, the electromagnetic effects neutralize each other at zero gate opening to give an effect of zero current.

The governor valve is schematically illustrated to show merely the operating members directly employed in the system herein described. The governor and the control valve mechanism constitute what is known in the art as the Lombard governor and does not per se enter into my invention. For that reason I am illustrating merely schematically the operation of the control valve mechanism.

The mechanism of the governor valve that is illustrated comprises a cylinder 30 within which a piston 31 is caused to assume various positions as controlled by the associated governor. Two inlets 32 and 33 are schematically illustrated through which oil under pressure is permitted to enter the cylinder 30 to control the position of the piston 31. The operating pump and other associated control mechanism are not shown since they do not per se enter into the invention contemplated by my system, and since the apparatus is well known in the art.

As the speed of a water-actuated device tends to increase by reason of a decreased load thereon, the associated valve is controlled to decrease the gate opening and to increase the amount of effective resistance in the associated resistors 8, 9 or 10. Similarly, as the speed of the water-actuated device tends to decrease by reason of an increased load thereon, the valve is controlled to effect the raising of the piston. The gate opening is thereupon increased to permit more water to be supplied to the water-actuated device. At the same time, the amount of effective resistance in the associated resistors 8, 9 or 10 is decreased and the winding 5 energized to a correspondingly greater degree.

The value of current caused to traverse the winding 5 is therefore controlled by the resistors 8, 9 and 10 to vary in accordance with the sum of the effective areas of the various gate openings, or the flow co-efficients of the several water wheels.

In order to get the total consumption of water, the sum of the effective areas of the various gate openings is multiplied by the velocity of the water. Since the current traversing the winding 5, of the meter 4, is proportional to the summation of the effective areas of the various gate openings, the current traversing the winding 6 of the meter 4 is caused to vary in accordance with the velocity of the water. The two windings 5 and 6 are in quadrature relation to each other and arranged so that their effects multiply, as required. As the head of the water in reservoir 34 varies, the sliding member 26, actuated by the pressure device 27 in accordance with the head of the water, withdraws part of the resistance of the resistor 25 from the circuit of the winding 6 of the meter 4. The velocity being equal to 8.02 times the square root of the head of the water, the resistor is proportioned to conform to the curve of the equation $$V^2 = 8.02\sqrt{h}.$$

The current traversing the winding 6 of the meter, therefore, varies in accordance with the change of velocity, as is required. If an indicating wattmeter be used as the meter 4, the rate of water consumption will be indicated and, if a watthour meter be used, the total consumption will be indicated, since the currents traversing windings 5 and 6 vary independently as the two separate factors which are to be multiplied, and the two windings are in quadrature relation so that their electromagnetic effects multiply.

My invention may be readily adapted for use in connection with steam or gas-driven devices, though described in this particular application in connection with water-driven devices, the indicating device is adapted to either switchboard or portable use.

I desire it to be understood that changes may be made in the actual construction of my invention for the purposes of simplifying the design, that will not depart from the spirit of the same as set forth in the appended claims.

I claim as my invention:

1. A device for measuring the flow of fluid to a plurality of fluid-actuated devices comprising a single indicating means, electro-responsive means actuated in accordance with the velocity of the fluid to be measured and electro-responsive means actuated in accordance with the summation of the effective gate-opening areas of the devices actuated by the fluid, said electro-responsive means cooperating to actuate said single indicating means.

2. In a system for measuring the flow of fluid to a plurality of fluid-actuated devices, the combination with a meter having a movable indicating element and two co-operating windings for actuating the element, of means for supplying current to one winding in accordance with the velocity of the fluid to be measured, and means for supplying current to the other winding in accordance with the summation of the effective gate-opening areas of the various fluid-actuated devices.

3. In a measuring system, the combination with a meter having a movable indicating element and two co-operating windings for actuating the element, of a pressure device having means to cause the current in one winding to vary in accordance with the velocity of the fluid to be measured, and a plurality of devices having means to cause the current in the second winding to vary in accordance with the summation of the effective gate-opening areas of a plurality of fluid-actuated devices.

4. In a measuring system, the combination with a meter having a movable indicating element and two co-operating windings for actuating the element, of a device having means to cause the current in one winding to vary in accordance with the velocity of the fluid to be measured, and means for supplying current to the other winding in accordance with the summation of the effective gate-opening areas of a plurality of fluid-actuated devices.

5. In a measuring system for measuring the flow of fluid to a plurality of fluid-actuated devices having variable effective gate-opening areas, the combination with a meter having a movable indicating element and two co-operating windings for actuating the element, of a pressure device having means to cause the current in one winding to vary in accordance with the velocity of the fluid to be measured, a plurality of variable resistors cooperating with the other winding and means for so adjusting the resistors that the current supplied to the other winding varies in accordance with the summation of the effective gate-opening areas of the fluid-actuated devices.

6. In a measuring system for measuring the flow of fluid to a plurality of fluid-actuated devices having variable effective gate-opening areas, the combination with a meter having a movable indicating element and two co-operating windings for actuating the element, of a device having a means to cause the current in one winding to vary in accordance with the velocity of the fluid to be measured, a plurality of variable resistors, and a plurality of gate governors having means for adjusting the resistors to vary the current supplied to the other winding will vary in accordance with the summation of the effective gate-opening areas of the fluid-actuated devices.

7. In a measuring system for measuring the flow of fluid to a plurality of fluid-actuated devices having variable effective gate-opening areas, the combination with a meter having a movable indicating element and two co-operating windings for actuating the element, of a pressure device actuated in accordance with the velocity of the fluid to be measured, a variable resistor controlled by the velocity device, a governor device for each fluid-actuated device, and a variable resistor controlled by each governor device in accordance with the effective gate-opening areas of the fluid-actuated device, said resistors being connected to the circuits of the windings for varying the currents therein in accordance with the effective values of the resistors.

8. In an instrument for measuring the flow of fluid to a plurality of fluid-actuated devices, the combination with a meter comprising an indicating element, and two co-operating windings and one differential winding for actuating said element, of a water-velocity-responsive device for controlling the current traversing one co-operating winding of the meter, a plurality of variable resistors controlled by the governors of the fluid-actuated devices for controlling the current through the second co-operating winding of the meter, and a resistor having a resistance equal to the sum of the resistances and connected in series with the differential winding, whereby the current traversing the differential winding of the meter is controlled to serve as a zero correction for the meter.

9. In an instrument for measuring the flow of fluid to a plurality of fluid-actuated devices, the combination with a meter comprising an indicating element, and two co-operating windings so disposed as to be in quadrature relation with each other and one differential winding so disposed as to be in opposition to one of the other two windings said windings co-operating to actuate said element, of means for supplying current to one of the co-operating windings in accordance with the pressure of the fluid to be measured, of means for supplying current to the other co-operating winding in accordance with the summation of the flow coefficients of the various fluid-actuated devices, and of means for supplying current to the said differential winding to serve as a zero correction for the said meter.

10. In a system for measuring the flow of fluid to a plurality of fluid-actuated devices having variable effective gate-opening areas, the combination with a meter having a movable indicating element and two co-operating quadrature windings for actuating the element, of means for supplying current to one winding in accordance with the velocity of the fluid to be measured, and means for supplying current to the other winding in accordance with the summation of the effective gate-opening areas of the various fluid-actuated devices.

In testimony whereof, I have hereunto subscribed my name this 10th day of May, 1922.

CHARLES McL. MOSS.